United States Patent
Wang et al.

(10) Patent No.: US 12,407,814 B2
(45) Date of Patent: Sep. 2, 2025

(54) VIDEO PROCESSING METHOD AND DEVICE THEREOF

(71) Applicant: SZ DJI TECHNOLOGY CO., LTD., Shenzhen (CN)

(72) Inventors: Suhong Wang, Shenzhen (CN); Xiaozhen Zheng, Shenzhen (CN); Shanshe Wang, Shenzhen (CN); Siwei Ma, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/608,642

(22) Filed: Mar. 18, 2024

(65) Prior Publication Data
US 2024/0251073 A1    Jul. 25, 2024

Related U.S. Application Data

(63) Continuation of application No. 17/362,309, filed on Jun. 29, 2021, now Pat. No. 11,936,847, which is a
(Continued)

(30) Foreign Application Priority Data

Dec. 29, 2018    (WO) ................ PCT/CN2018/125843

(51) Int. Cl.
*H04N 19/105*    (2014.01)
*H04N 19/129*    (2014.01)
(Continued)

(52) U.S. Cl.
CPC ......... *H04N 19/105* (2014.11); *H04N 19/129* (2014.11); *H04N 19/137* (2014.11);
(Continued)

(58) Field of Classification Search
CPC .. H04N 19/105; H04N 19/176; H04N 19/137; H04N 19/129; H04N 19/52; H04N 19/1883
See application file for complete search history.

(56) References Cited

U.S. PATENT DOCUMENTS 10,440,378 B1 * 10/2019 Xu ........................ H04N 19/105
11,671,590 B2 * 6/2023 Lee ........................ H04N 19/96
                                                     375/240.02
(Continued)

FOREIGN PATENT DOCUMENTS

CN    103535039 A    1/2014
CN    103636218 A    3/2014
(Continued)

OTHER PUBLICATIONS

Suhong Wang, et al., CE4-related: Simplification for share merge list and HMVP harmonization process. Joint Video Experts Team (JVET) of ITU-T SG 16 WP 3 and ISO/IEC JTC 1/SC 29/WG 11, JVET-NO486_v4, 14th Meeting: Geneva, CH. Mar. 2019, pp. 1-7.
(Continued)

*Primary Examiner* — Tsion B Owens
(74) *Attorney, Agent, or Firm* — ANOVA LAW GROUP, PLLC

(57) ABSTRACT

A bitstreams generating method includes obtaining a historical motion information candidate list used for encoding each of a plurality of image blocks included in a region of a current frame, encoding the plurality of image blocks according to the historical motion information candidate list, and generating bitstreams including one or more indexes of motion information. The historical motion information candidate list is a history-based motion vector prediction (HMVP) candidate list. During the process of encoding all the plurality of image blocks included in the region, the historical motion information candidate list is not updated.
(Continued)

Only the motion information of the last image block in the region is used to update the historical motion information candidate list after the encoding process of the last image block is finished.

19 Claims, 7 Drawing Sheets

Related U.S. Application Data continuation of application No. PCT/CN2019/078049, filed on Mar. 13, 2019.

(51) Int. Cl.
  *H04N 19/137* (2014.01)
  *H04N 19/169* (2014.01)
  *H04N 19/176* (2014.01)
  *H04N 19/52* (2014.01)

(52) U.S. Cl.
  CPC ....... *H04N 19/176* (2014.11); *H04N 19/1883* (2014.11); *H04N 19/52* (2014.11)

(56) References Cited

U.S. PATENT DOCUMENTS

| | | | |
|---|---|---|---|
| 12,284,379 B2 * | 4/2025 | Li | H04N 19/176 |
| 2013/0170549 A1 | 7/2013 | Li et al. | |
| 2013/0272408 A1 | 10/2013 | Chen et al. | |
| 2013/0272412 A1 | 10/2013 | Seregin et al. | |
| 2014/0161186 A1 | 6/2014 | Zhang et al. | |
| 2015/0317801 A1 * | 11/2015 | Bentley | G08B 21/043 |
| | | | 382/107 |
| 2016/0057441 A1 | 2/2016 | Skupin et al. | |
| 2017/0034512 A1 | 2/2017 | Casula | |
| 2017/0280159 A1 | 9/2017 | Xu et al. | |
| 2018/0109805 A1 | 4/2018 | Takehara et al. | |
| 2020/0059658 A1 * | 2/2020 | Chien | H04N 19/176 |
| 2020/0077085 A1 * | 3/2020 | Zhang | H04N 19/176 |
| 2020/0107017 A1 * | 4/2020 | Hung | H04N 19/132 |
| 2020/0112715 A1 | 4/2020 | Hung et al. | |
| 2020/0186819 A1 | 6/2020 | Xu et al. | |
| 2020/0280724 A1 * | 9/2020 | Jeon | H04N 19/436 |
| 2021/0195229 A1 | 6/2021 | Esenlik et al. | |
| 2021/0211709 A1 | 7/2021 | Zhang et al. | |
| 2021/0266590 A1 | 8/2021 | Abe et al. | |
| 2021/0321089 A1 | 10/2021 | Lin et al. | |
| 2021/0329227 A1 | 10/2021 | Zheng et al. | |

FOREIGN PATENT DOCUMENTS

| | | |
|---|---|---|
| CN | 103765896 A | 4/2014 |
| CN | 103931192 A | 7/2014 |
| CN | 103931196 A | 7/2014 |
| CN | 104079944 A | 10/2014 |
| CN | 104796724 A | 7/2015 |
| CN | 106878749 A | 6/2017 |
| CN | 107005692 A | 8/2017 |
| CN | 103535039 B | 8/2018 |
| CN | 108781284 A | 11/2018 |
| CN | 109068140 A | 12/2018 |
| EP | 3843389 A1 | 6/2021 |
| JP | 2003209846 A | 7/2003 |
| JP | 7415065 B2 | 1/2024 |
| KR | 101210892 B1 | 12/2012 |
| KR | 20130002242 A | 1/2013 |
| KR | 1020140043242 A | 4/2014 |
| WO | 2012097742 A1 | 7/2012 |
| WO | 2017043734 A1 | 3/2017 |
| WO | 2018058526 A1 | 4/2018 |
| WO | 2020003266 A1 | 1/2020 |
| WO | 2020018297 A1 | 1/2020 |
| WO | 2020060329 A1 | 3/2020 |
| WO | 2020114420 A1 | 6/2020 |
| WO | 20200150577 A1 | 7/2020 |

OTHER PUBLICATIONS

The World Intellectual Property Organization (WIPO) International Search Report for PCT/CN2019/078049 Sep. 17, 2019 11 pages (translation included).
The World Intellectual Property Organization (WIPO) International Search Report for PCT/CN2018/125843 Oct. 10, 2019 10 pages (translation included).
The World Intellectual Property Organization (WIPO) International Search Report for PCT/CN2019/109659 Jan. 10, 2020 9 pages (translation included).
<<Joint Video Experts Team (JVET) of ITU-T SG 16WP 3 and ISO/IEC JTC 1/SC 29/WG 11 12th Meeting: Macau, CN, Oct. 8-12, 2018, Document: JVET-L0575-v2>>; Oct. 5, 2018; Weiwei Xu et al. CE4-Related: CTU-Level Initialization of History-based Motion Vector Prediction.
<<Joint Video Experts Team (JVET)>>, Oct. 12, 2018, Li Zhang et al. CE4: History-based Motion Vector Prediction (Test 4.4.7).
Benjamin Bross et al: "Versatile Video Coding (Draft 3)", JVET Meeting; Oct. 3, 2018-Oct. 12, 2018, No. JVET-L1001-v7; JVET-L1001, Dec. 20, 2018, pp. 1-223.
Zhao (LGE) J et al: "CE4-related: Simplification to History Based Motion Vector Prediction", 124. MPEG Meeting; Oct. 8, 2018-Oct. 12, 2018; Macao; (Motion Picture Expert Group or ISO/IEC JTC1/SC29/WG11), No. m44333 Oct. 3, 2018.
Park, Naeri et al., CE4-related: History-Based Motion Vector Prediction considering parallel processing , Joint Video Experts Team (JVET) of ITU-T SG 16 WP 3 and ISO/IEC JTC 1/SC 29/WG 11 12th Meeting: Macau, CN, Oct. 8-12, 2018, pp. 1-6.
Semih Esenlik, et al. , Non-CE4: Parallel Merge Estimation for VVC , Joint Video Experts Team (JVET) of ITU-T SG 16 WP 3 and ISO/IEC JTC 1/SC29/WG 11 , JVET-L0216 , 12th Meeting: Macao, CN, Sep. 2018, pp. 1-7.
Li Zhang, et al. , CE4-related: History-based Motion Vector Prediction , Joint Video Experts Team (JVET) of ITU-T SG 16 WP 3 and ISO/IEC JTC 1/SC 29/WG 11 , JVET-K0104-v5 , 11th Meeting: Ljubljana, SI, Jul. 2018, pp. 1-7.
Xiaozhong Xu, et al., CE4-related: History based spatial-temporal MV prediction , Joint Video Experts Team (JVET) of ITU-T SG16 WP 3 and ISO/IEC JTC 1/SC 29/WG 11 , JVET-L0302-v1 , 12th Meeting: Macao, CN, Sep. 2018, pp. 1-2.
Yi-Wen Chen, et al., CE4-related: Modified History-based MVP to support parallel processing , Joint Video Experts Team (JVET) of ITU-T SG 16 WP 3 and ISO/IEC JTC 1/SC 29/WG 11 , JVET-L0106 , 12th Meeting: Macao, CN, Sep. 2018, pp. 1-3.
Timofey Solovyev, et al., CE4-related: History-based MVP without using the last lookup table entry , Joint Video Experts Team (JVET) of ITU-T SG 16 WP 3 and ISO/IEC JTC 1/SC 29/WG 11 , JVET-L0425-v6 , 12th Meeting: Macao, CN, Oct. 2018, pp. 1-4.
B. Girod, "Motion-compensating prediction with fractional-pel accuracy," IEEE Transactions on Communications, vol. 41, No. 4, pp. 604-612, 1993.
https://jvet.hhi.fraunhofer.de/jvet/VVCSoftware_VTM.
Truong Quang Vinh, et al., "Frame rate up-conversion using forward-backward jointing motion estimation and spatio-temporal motion vector smoothing", 2009 International Conference on Computer Engineering and Systems, Dec. 16, 2009.
Hongyu Hu, et al., "Representation and Analysis of Pedestrian Crossing States Based on Video Tracking", Jun. 20, 2009.

* cited by examiner

300

Use a historical motion information candidate list to encode or decode at least one second image block in a second region of a current frame — 310

Based on motion information of at least a portion of second image blocks in the second region after being encoded or decoded, update the historical motion information candidate list, to obtain an updated historical motion information candidate list — 320

Use the updated historical motion information candidate list to encode or decode a plurality of first image blocks in a first region of the current frame — 330

FIG. 3

VIDEO PROCESSING METHOD AND DEVICE THEREOF

CROSS-REFERENCE TO RELATED APPLICATION

This application is a continuation of International application Ser. No. 17/362,309, filed Jun. 29, 2021, which is a continuation of International Application No. PCT/CN2019/078049, filed Mar. 13, 2019, which claims priority to International Application No. PCT/CN2018/125843, filed Dec. 29, 2018, the entire contents of all of which are incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the field of image processing technologies and, more particularly, to a video processing method and a video processing device.

BACKGROUND

Prediction is an important module of a mainstream video coding framework. Prediction includes intra-frame prediction and inter-frame prediction. An inter-frame prediction mode includes an advanced motion vector prediction (AMVP) mode and a merge (Merge) mode. In the Merge mode, a motion vector prediction (MVP) can be determined in a motion vector prediction candidate list, and the MVP can be directly determined as the motion vector (MV). Further, the MVP and reference frame index can be transmitted to a decoder side in a bitstream, for decoding on the decoder side.

When establishing the aforementioned MVP candidate list, the candidate history-based motion vector prediction (HMVP) may be selected from the history-based motion vector prediction candidate list as the candidate MVP in the MVP candidate list.

The HMVP candidate list is generated based on motion information of encoded or decoded blocks. For example, when encoding or decoding of an encoded or decoded block is completed, the motion information of the encoded or decoded block is used to update the HMVP list of a next block to-be-encoded or decoded. HMVP list can be further improved.

SUMMARY

In accordance with the disclosure, there is provided a video processing method including dividing a region of a current frame to obtain a plurality of image blocks, obtaining a historical motion information candidate list, and obtaining candidate historical motion information for the plurality of image blocks according to the historical motion information candidate list. The candidate historical motion information is a candidate in the historical motion information candidate list. The method further includes performing prediction for the plurality of image blocks according to the candidate historical motion information. A size of each of the plurality of image blocks is smaller than or equal to a preset size. The same historical motion information candidate list is used for the plurality of image blocks during the prediction. The historical motion information candidate list is not updated while the prediction is being performed for the plurality of image blocks.

Also in accordance with the disclosure, there is provided an encoder including a memory storing instructions and a processor configured to execute the instructions to divide a region of a current frame to obtain a plurality of image blocks, obtain a historical motion information candidate list, and obtain candidate historical motion information for the plurality of image blocks according to the historical motion information candidate list. The candidate historical motion information is a candidate in the historical motion information candidate list. The processor is further configured to execute the instructions to perform prediction for the plurality of image blocks according to the candidate historical motion information. A size of each of the plurality of image blocks is smaller than or equal to a preset size. The same historical motion information candidate list is used for the plurality of image blocks during the prediction. The historical motion information candidate list is not updated while the prediction is being performed for the plurality of image blocks.

Also in accordance with the disclosure, there is provided a decoder including a memory storing instructions and a processor configured to execute the instructions to divide a region of a current frame to obtain a plurality of image blocks, obtain a historical motion information candidate list, and obtain candidate historical motion information for the plurality of image blocks according to the historical motion information candidate list. The candidate historical motion information is a candidate in the historical motion information candidate list. The processor is further configured to execute the instructions to perform prediction for the plurality of image blocks according to the candidate historical motion information. A size of each of the plurality of image blocks is smaller than or equal to a preset size. The same historical motion information candidate list is used for the plurality of image blocks during the prediction. The historical motion information candidate list is not updated while the prediction is being performed for the plurality of image blocks.

BRIEF DESCRIPTION OF THE DRAWINGS

In order to explain the technical solutions of the embodiments of the present application more clearly, drawings used in the description of the embodiments or the existing technologies will be briefly described. Obviously, the drawings in the following description are only some embodiments of the present application. For those of ordinary skill in the art, other drawings can be obtained based on these drawings without creative work.

FIG. 3 is a schematic flow chart of a video processing method consistent with an embodiment of the present disclosure.

DETAILED DESCRIPTION OF THE EMBODIMENTS

The technical solutions in the embodiments of the present disclosure will be described below in conjunction with the drawings in the embodiments of the present disclosure. Obviously, the described embodiments are some of the embodiments of the present disclosure, but not all of the embodiments. Based on the embodiments in this disclosure, all other embodiments obtained by those of ordinary skill in the art without creative work shall fall within the scope of this disclosure.

Unless otherwise specified, all technical and scientific terms used in the embodiments of the present disclosure have the same meaning as commonly understood by those skilled in the technical field of the present application. The terms used in this disclosure are only for the purpose of describing specific embodiments, and are not intended to limit the scope of this application.

Figure 1:
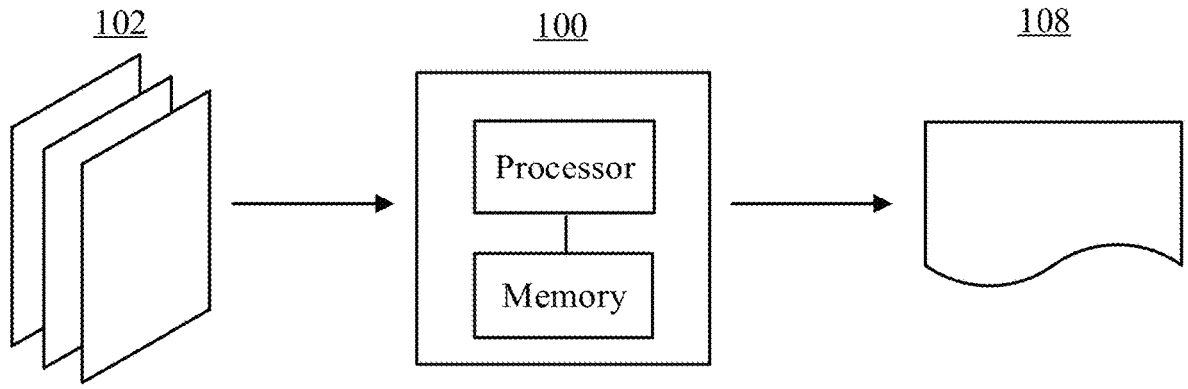
FIG. 1 is an architectual diagram of a technical solution consistent with an embodiment of the present disclosure.

FIG. 1 is an architectural diagram of a technical solution implementing embodiments of the present disclosure.

As shown in FIG. 1, a system 100 receives to-be-processed data 102, and processes the to-be-processed data 102, to generate processed data 108. For example, the system 100 may receive data to be encoded and encode the data to be encoded to generate encoded data, or the system 100 may receive data to be decoded and decode the data to be decoded to generate decoded data. In some embodiments, components in the system 100 may be implemented by one or more processors. The one or more processors may be processors in a computing device or processors in a mobile device (such as an unmanned aerial vehicle). The one or more processors may be any type of processor, which is not limited in the embodiments of the present disclosure. In some embodiments, the one or more processors may include an encoder, a decoder, or a codec, etc. One or more memories may also be included in the system 100. The one or more memories can be used to store instructions or data, for example, including computer-executable instructions that implement the technical solutions of the embodiments of the present disclosure, the to-be-processed data 102, or the processed data 108, etc. The one or more memories may be any type of memory, which is not limited in the embodiment of the present disclosure.

The data to be encoded may include text, images, graphic objects, animation sequences, audio, video, or any other data that needs to be encoded. In some embodiments, the data to be encoded may include sensor data from sensors including vision sensors (for example, cameras, infrared sensors), microphones, near-field sensors (for example, ultrasonic sensors, radar), position sensors, temperature sensors, or touch sensors, etc. In some other embodiments, the data to be encoded may include information from the user, for example, biological information. The biological information may include facial features, fingerprint scans, retinal scans, voice recordings, DNA sampling, and so on.

When encoding each image, the image may be initially divided into a plurality of image blocks. In some embodiments, the image may be divided into a plurality of image blocks, which are called macroblocks, largest coding units (LCUs), or coding tree units (CTUs) in some coding standards. The plurality of image blocks may or may not have any overlapping parts. The image can be divided into any number of image blocks. For example, the image can be divided into an array of m×n image blocks. Each of the plurality of image block may have a rectangular shape, a square shape, a circular shape, or any other shape. Each of the plurality of image block can have any size, such as p×q pixels. In modern video coding standards, images of different resolutions can be encoded by first dividing each image of the images into multiple small blocks. For H.264, an image block may be called a macroblock, and its size can be 16×16 pixels, and for HEVC, an image block may be called a largest coding unit, and its size can be 64×64. Each image block of the plurality of image blocks may have the same size and/or shape. Alternatively, two or more image blocks of the plurality of image blocks may have different sizes and/or shapes. In some embodiments, an image block may not be a macro block or a largest coding unit, but a part of a macro block or a largest coding unit, or may include at least two complete macro blocks (or largest coding units), or may include at least one complete macroblock (or largest coding unit) and a part of a macroblock (or largest coding unit), or may include at least two complete macroblocks (or largest coding units) and parts of some macroblocks (or largest coding units). In this way, after the image is divided into the plurality of image blocks, the image blocks in the image data can be respectively coded.

In the encoding process, to remove redundancy, the image may be predicted. Different images in the video can use different prediction methods. According to the prediction method adopted by the image, the image can be divided into an intra-frame prediction image and an inter-frame prediction image, where the inter-frame prediction image includes a forward prediction image and a bidirectional prediction image. An I image is an intra-frame prediction image, also called a key frame. A P image is a forward prediction image, that is, a previously encoded P image or I image is used as a reference image. A B image is a bidirectional prediction image, that is, the images before and after the image are used as reference images. One way to achieve this may be that the encoder side generates a group of images (GOP) including multiple segments after encoding multiple images. The GOP may include one I image, and multiple B images (or bidirectional predictive images) and/or P images (or forward prediction images). When playing, the decoder side may read a segment of the GOP, decode it, read the images, and then render and display.

Specifically, when performing inter-frame prediction, a most similar block in the reference frame (usually a reconstructed frame near the time domain) can be found for each image block of the plurality of image blocks as the prediction block of the current image block. A relative displacement between the current block and the predicted block is a motion vector (MV).

The inter-frame prediction modes in the video coding standard may include an AMVP mode or a Merge mode.

For the AMVP mode, the MVP may be determined first. In order to obtain the MVP, an MVP candidate list (AMVP candidate list) can be constructed first. In the MVP candidate list, at least one candidate MVP can be included, and each candidate MVP can correspond to an index. After the MVP is obtained, the starting point of the motion estimation can be determined according to the MVP. A motion search may be performed near the starting point. After the search is completed, the optimal MV may be obtained. The MV may be used to determine the position of the reference block in the reference image. The reference block may be subtracted from the current block to obtain a residual block, and the MV may be subtracted from the MVP to obtain a motion vector difference (MVD). The index corresponding to the MVP and the MVD may be transmitted to the decoder through the bitstream.

For the Merge mode, the MVP can be determined first, and the MVP can be directly determined as the MV. To obtain the MVP, an MVP candidate list (merge candidate list) may be established first. The MVP candidate list may include at least one candidate MVP. Each candidate MVP may correspond to an index. After selecting the MVP from the MVP candidate list, the encoder may write the index corresponding to the MVP into the bitstream, and the decoder may find the MVP corresponding to the index from the MVP candidate list according to the index, to realize the decoding of the image block.

The process for encoding with the Merge mode will be described below for more clearly understanding the Merge mode.

In S1, the MVP candidate list may be obtained.

In S2, an optimal MVP may be selected from the MVP candidate list and an index of the optimal MVP in the MVP candidate list may also be obtained.

In S3, the optimal MVP may be determined as the MV of the current block.

In S4, a position of the reference block in the reference image may be determined according to the MV.

In S5, the current block may be subtracted from the reference block to obtain the residual block.

In S6, the residual data and the index of the optimal MVP may be transmitted to the decoder.

The above process is only a specific implementation of the Merge mode, and does not limit the scope of the present disclosure. The Merge mode may be implemented in other way.

For example, a Skip mode is a special case of Merge mode. After obtaining the MV according to the Merge mode, if the encoder determines that the current block is basically the same as the reference block, there is no need to transmit the residual data and only the index of the MV needs to be transmitted. Further a flag can be transmitted, and the flag may indicate that the current block can be directly obtained from the reference block.

In other words, the feature of the Merge mode is: MV=MVP (MVD=0). The Skip mode has one more feature, i.e., reconstruction value rec=predicted value pred (residual value resi=0).

When constructing the aforementioned MVP candidate list (also referred to as a candidate list or a motion information candidate list) of the AMVP mode and/or the Merge mode, a candidate HMVP can be selected from the HMVP candidate list as the candidate MVP in the MVP candidate list. There are many ways to update the HMVP candidate list. The two update schemes of the HMVP candidate list are described below.

For the HMVP mentioned above, when the encoding of an encoded block is completed, the motion information of the encoded block can be used to update the HMVP list of a next to-be-encoded block, to make the dependence between the plurality of image blocks stronger.

In hardware implementation, to increase throughput, the encoding (such as motion estimation, etc.) processes of adjacent blocks can be performed in parallel. However, the dependency will make parallel processing impossible when constructing the HMVP candidate list.

The present disclosure provides a solution to overcome the dependency between the plurality of image blocks.

It should be understood that the implementation of the present disclosure can be applied to not only the Merge mode or AMVP mode, but also other encoding/decoding modes. The present disclosure may be applied to any encoding/decoding mode that adopts historical motion information candidate list (for example, the HMVP candidate list) during the encoding/decoding process.

The solution of the embodiments of the present disclosure can overcome the dependency between the plurality of image blocks, and thus can be used in scenarios where the plurality of image blocks is processed in parallel. However, it should be understood that the embodiments of the present disclosure can also be used in scenarios where non-parallel processing is performed, to overcome the dependence between the plurality of image blocks for other purposes.

Figure 2:
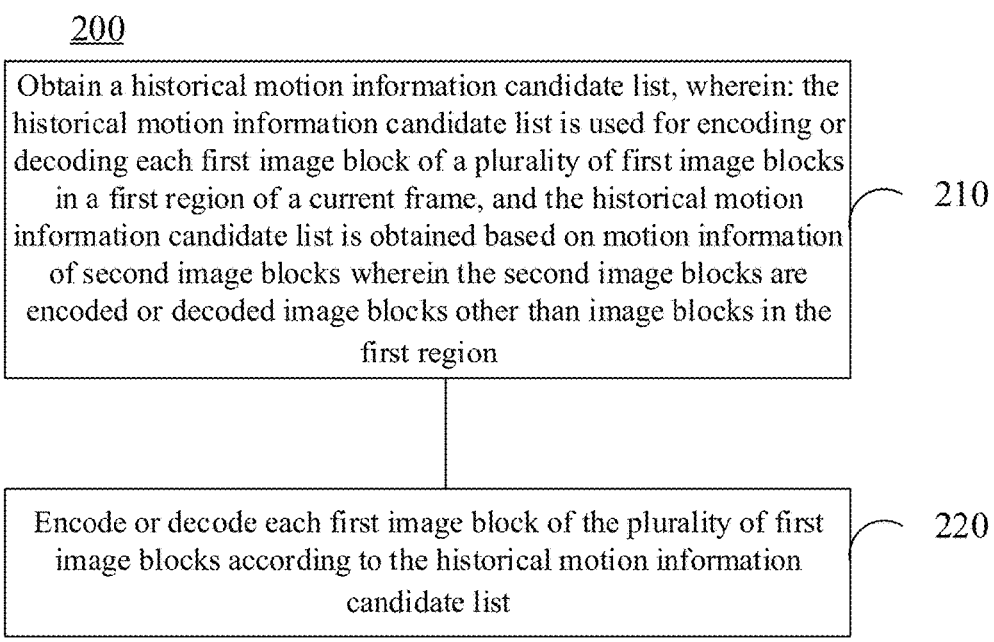
FIG. 2 is a schematic flow chart of a video processing method consistent with an embodiment of the present disclosure.

One embodiment of the present disclosure provides a video processing method 200 shown in FIG. 2. The video processing method 200 includes at least a portion of the following content, and can be applied to the encoder side or the decoder side.

In 210, a historical motion information candidate list is obtained. The historical motion information candidate list is used for encoding or decoding each first image block of a plurality of first image blocks in a first region of a current frame. The historical motion information candidate list is obtained based on motion information of second image blocks. The second image blocks are encoded or decoded image blocks other than image blocks in the first region.

In 220, each first image block of the plurality of first image blocks is encoded or decoded according to the historical motion information candidate list.

One embodiment of the present disclosure provides a video processing method 300 shown in FIG. 3. The video processing method 300 includes at least a portion of the following content, and can be applied to the encoder side or the decoder side.

In 310, the historical motion information candidate list is used to encode or decode at least one second image block in the second region of the current frame.

In 320, the historical motion information candidate list is updated according to the motion information of the at least a portion of the second image blocks in the second region after being encoded or decoded, to obtain an updated historical motion information candidate list.

In 330, the updated historical motion information candidate list is used to encode or decode the plurality of first image blocks in the first region of the current frame.

In the method 200 and the method 300, the motion information of the second image blocks in the second region after being encoded or decoded may be used to establish the historical motion information candidate list, and then the historical motion information candidate list may be used to encode or decode the plurality of first image blocks. The dependency between the plurality of first image blocks may be overcame, such that each of the plurality of first image blocks can be encoded or decoded independently.

For a clearer understanding of the present disclosure, specific implementation of the embodiments of the present disclosure will be described below, and the implementation below can be applied to the method 200 or the method 300.

The historical motion information candidate list in the embodiments of the present disclosure may include at least one piece of candidate historical motion information. The at least one piece of candidate historical motion information may be selected for establishing the motion information list. The encoder side or the decoder side can thus select the motion information of the current image block from the motion information list. Specifically, the candidate historical motion information can be obtained based on the motion information of the encoded or decoded image blocks.

Optionally, the motion information in the embodiment of the present disclosure may represent a combination of one or more of a motion vector, a reference frame index value, a motion vector difference, or a motion vector prediction value.

The historical motion information candidate list in the embodiment of the present disclosure may be an HMVP candidate list, and the HMVP candidate list may optionally include at least one candidate MVP.

Scheme One

In some embodiments, a region (for example, the first region or the second region) in the embodiments of the present disclosure may be a motion estimation region (MER). The MER may be a rectangular region, or a non-rectangular region, for example, a non-rectangular region including multiple squares and/or rectangles.

The encoding process of the image blocks in each region can be processed in parallel.

The size of each region in the embodiments of the present disclosure may be the same or different. Each region can be square, rectangle, rhombus, triangle, trapezoid, or circle.

In the embodiments of the present disclosure, each region may only belong to one coding tree unit (CTU), that is, each region may not cross CTUs. Each CTU may include one or more regions. In some other embodiments, each region may include one or more CTUs, or include a non-integer number of CTUs. That is, a certain CTU may belong to multiple regions.

In the embodiments of the present disclosure, each region may include one or more image blocks, and the size of each image block may be the same or different. The number of image blocks included in each region may be the same or different. Pixels in each region may not have overlapping parts.

In the embodiments of the present disclosure, an image blocks may be a coding unit (CU), or of course, may also be a prediction unit (PU), which is not specifically limited in the embodiments of the present disclosure.

Figure 4:
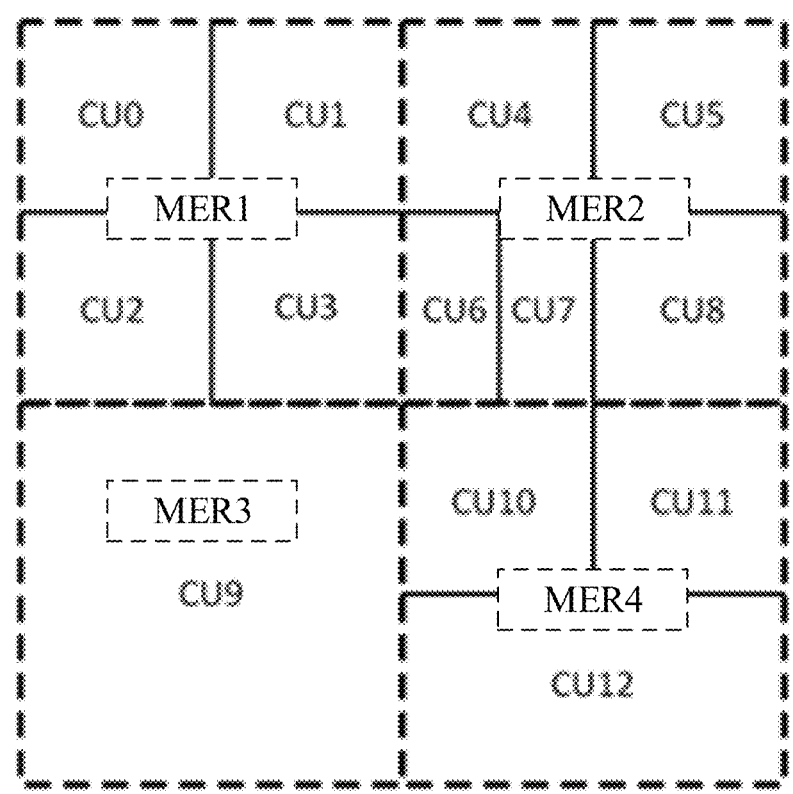
FIG. 4 is a composition diagram of an MER consistent with an embodiment of the present disclosure.

For example, FIG. 4 shows four MERs including MER1, MER2, MER3 and MER4. The size of the four MERs can be the same, and the number of image blocks included in each MER can be different. MER1 has four CUs including CU0, CU1, CU2, and CU3, and MER2 has five CUs including CU4, CU5, CU6, CU7, and CU8. MER3 includes CU9, and MER4 includes CU10, CU11 and CU12. The size of each CU may not be the same.

Figure 5:
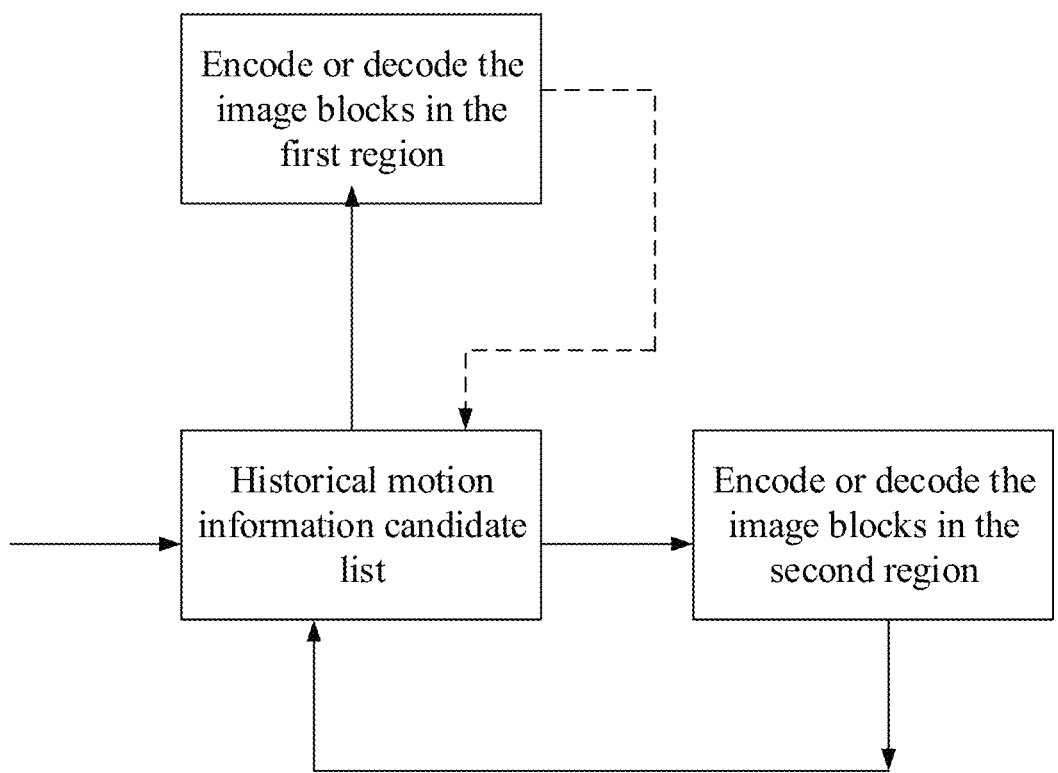
FIG. 5 is a schematic diagram showing a video processing method consistent with an embodiment of the present disclosure.

Optionally, in one embodiment shown in FIG. 5, the motion information of the encoded or decoded image blocks in the previous region (the second region) may be used to update the historical motion information candidate list, and then the updated historical motion information candidate list may be used to encode or decode the image blocks in the current region (the first region). Further, the motion information of the encoded or decoded image blocks in the current region may be used to update the historical motion information candidate list again for encoding or decoding of the image blocs in the next region. Optionally, when encoding or decoding different first image blocks for the first region, the candidate historical motion information in the historical motion information candidate list which is adopted may have a same order as the candidate historical motion information in the historical motion information candidate list.

Taking the region as MER as an example, after all image blocks in the current MER are encoded or decoded, to ensure that the historical motion information candidate list for encoding or decoding the CU in the next MER is different from the historical motion information candidate used by the current MER, the motion information of the image blocks in the current MER may be used to update the historical motion information candidate list. When encoding or decoding the CU in the next MER, the updated historical motion information candidate list may be used to obtain the constructed motion information list.

For example, as shown in FIG. 4, after all the image blocks (CU0-CU3) in MER1 are encoded or decoded, before the image blocks in MER2 are encoded or decoded, the historical motion information candidate list can be updated with the motion information of CU0-CU3. After the update of the historical motion information candidate list is completed, during the process of encoding or decoding all image blocks (CU4-CU8) in MER2, the historical motion information candidate list used will no longer be updated, and the same history motion information candidate list is used. After the encoding or decoding of all image blocks (CU9) in MER3 is completed, before encoding or decoding image blocks in MER4, the motion information of CU9 needs to be used to update the historical motion information candidate list. After the historical motion information candidate list is updated, in the process of encoding or decoding all image blocks (CU10-CU12) in MER4, the historical motion information candidate list used is no longer updated, and the same historical motion information candidate list is used.

Optionally, in one embodiment, when constructing the motion information list using the historical sports information candidate list, a first-in-first-out principle can be adopted, that is, the historical sports information that is added first is first selected for construction of the sports information list.

Specifically, the first motion information (obtained based on the motion information of the encoded or decoded image blocks in the second region) may be added to the header of the historical motion information candidate list. The header here refers to a position in the historical motion information candidate list that is first selected for construction of the motion information list. Correspondingly, the historical motion information first added to the historical motion information candidate list can be preferentially selected for construction of the motion information list.

In one embodiment, the number of pieces of candidate historical motion information included in the historical motion information candidate list may be preset, that is, the size of the historical motion information candidate list may be fixed. For example, the number of pieces of candidate historical motion information included in the historical motion information candidate list may be fixed to 6.

Correspondingly, adding the motion information of the encoded or decoded image blocks to the historical motion information candidate list may increase the number of pieces of candidate historical motion information included in the historical motion information candidate list. The same number of pieces of candidate historical motion information may be deleted from the historical motion information candidate list at the same time.

Specifically, when deleting the candidate historical motion information from the historical motion information candidate list, the deleted candidate historical motion information may be the candidate historical motion information at the end of the historical motion information candidate list. The candidate historical motion information at the end of the historical motion information candidate list may refer to the candidate historical motion information that is last selected to construct the motion information list.

Alternatively, in other embodiments, other methods may also be used to delete candidate historical motion information from the historical motion information candidate list.

For example, when the candidate historical motion information added to the historical motion information candidate list is the same as the candidate historical motion information that already exists in the historical motion information candidate list, the same candidate historical motion information can be deleted. It can also be understood that the position of the same candidate historical motion information in the historical motion information candidate list is moved to the header of the historical motion information candidate list.

Figure 6:
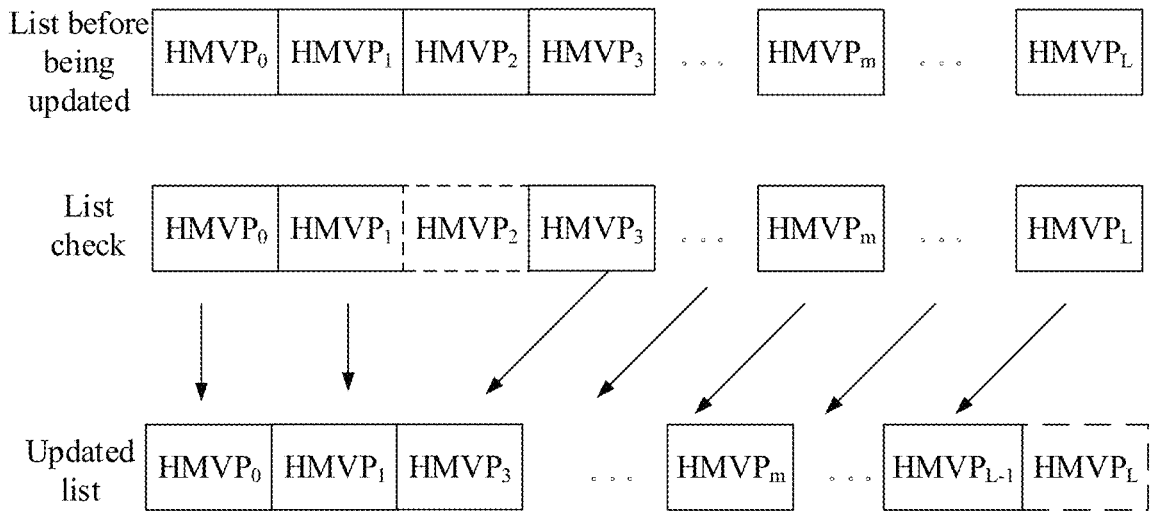
FIG. 6 is a schematic diagram showing updating of an HMVP consistent with an embodiment of the present disclosure.

For example, as shown in FIG. 6, the HMVP candidate list before the update includes L candidate historical motion information, and the candidate historical motion information to be added is $HMVP_2$. The HMVP candidate list is checked, and the same $HMVP_2$ is found in the HMVP candidate list before the update. Correspondingly, the HMVP2 can be moved to the head of the HMVP candidate list, and the positions of other candidate historical motion information can be adjusted accordingly. Alternatively, FIG. 6 can also be understood as adding $HMVP_2$ to the HMVP candidate list before the update, and deleting $HMVP_2$ in the HMVP candidate list before the update.

It should be understood that the aforementioned operations of deleting candidate historical motion information at the end of the table and deleting candidate historical motion information that is the same as the added candidate historical motion information may exist at the same time.

For example, in one embodiment, there is two pieces of candidate historical motion information that needs to be added. One piece of candidate historical motion information is the same as one certain piece of candidate historical motion information in the list before the update, and another piece of candidate historical motion information does not exist in the list before the update. Correspondingly, the one piece of candidate historical motion information same as one certain piece of candidate historical motion information in the list before the update can be deleted from the list, and the one piece of candidate historical motion information at the end of the table can be deleted, such that the number of the added candidate historical motion information is the same as the number of the deleted candidate historical motion information.

Optionally, in one embodiment, each time the historical motion information candidate list is updated, the number of pieces of candidate historical motion information added and/or the number of pieces of candidate historical motion information deleted from the historical motion information candidate list may be less than a preset value, and the preset value may be less than or equal to the number of pieces of candidate historical motion information that is allowed to be included in the historical motion information candidate list.

Optionally, in one embodiment, the motion information of all encoded or decoded image blocks in the second region can be used to update the historical motion information candidate list, or the motion information of a portion of the encoded or decoded image blocks in the second region may be used to update the historical motion information candidate list.

Optionally, in one embodiment, the second image blocks used to update the historical motion information candidate list may be the last encoded or decoded image block in the second region, and/or may include image blocks at the specified positions in the second region.

Specifically, the image blocks at the specified position in the second region may include image blocks located at at least one of the positions including the upper left corner of the second region, the upper right corner of the second region, the lower left corner of the second region, the lower right corner of the second region, and the center point of the second region.

Optionally, in one embodiment, the second image blocks in the second region that can be used to update the historical motion information candidate list may be selected according to the position coordinates and/or coding order of each second image block.

Specifically, the priority of the image blocks on the right in the second region may be higher than the priority of the image blocks on the left in the second region, and/or the priority of the image blocks in the lower side of the second region may be higher than the priority of the image blocks in the upper side of the second region. The lower side and the upper side mentioned here may be relative positions, rather than necessarily being directly up or down. Or, the priority of the motion information of the image blocks coded earlier may be higher than the priority of the image blocks coded later.

For example, as shown in FIG. 4, MER2 is selected as the current region (that is, the first region). The priority of CU1 and CU3 of MER1 is higher than the priority of CU0 and CU2, and the priority of CU3 is higher than the priority of CU1.

It should be understood that, in the embodiments of the present application, the priority of each second image block in the second region not only can be determined according to the position coordinates and/or coding order of the second image block, but also can be determined according to other factors. The present disclosure has no limit on this.

Optionally, in one embodiment, the encoded or decoded image blocks can be selected from the second region according to the quantity of historical motion information that needs to be updated each time. The motion information of the selected encoded or decoded image blocks may be used to update the historical motion information candidate list. The number of pieces of historical motion information that needs to be updated can be equal to the number of selected encoded or decoded image blocks.

For example, when two pieces of candidate historical motion information in the historical motion information candidate list need to be updated, two encoded or decoded image blocks from the second region may be selected. The motion information of the selected two encoded or decoded image blocks may be added to the historical motion information candidate list and two pieces of candidate historical motion information may be deleted.

Optionally, in another embodiment, the number of the selected encoded or decoded image blocks may be larger than the number of pieces of historical motion information that need to be updated. At this time, the motion information of all or part of the selected encoded or decoded image blocks may be weighted, such that the number of the available historical motion information is equal to the number of pieces of candidate historical motion information that needs to be updated.

For example, the number of pieces of historical motion information that need to be updated to the historical motion information candidate list is one, and the number of selected encoded or decoded image blocks is three. Correspondingly, the motion information of the three encoded or decoded image blocks can be weighted to obtain one piece of candidate historical motion information. The one piece of candidate historical motion information is added to the candidate list of historical motion information, and one piece of candidate historical motion information is deleted from the historical motion information candidate list.

For example, the number of pieces of historical motion information that need to be updated to the historical motion information candidate list is two, and the number of selected encoded or decoded image blocks is three. Correspondingly, the motion information of two of the three encoded or decoded image blocks can be weighted to obtain one piece of candidate historical motion information. The obtained one piece of candidate historical motion information and one piece of candidate motion information which is not processed are added to the historical motion information candidate list, and two pieces of candidate historical motion information are deleted from the historical motion information candidate list.

When weighting the motion information of multiple encoded or decoded image blocks, the averaging process may or may not be performed.

The weight of each motion information may be determined based on the position relationship of one corresponding encoded or decoded image block and the region, and/or encoding or decoding order of each encoded or decoded image block.

For example, the priority of the motion information of the image blocks belonging to the second region located on the left of the first region may be higher than the priority of the motion information of the image blocks on the upper left and lower left.

For example, the priority of the motion information of the image blocks encoded earlier is higher than the priority of the image blocks encoded later.

Optionally, in one embodiment, multiple pieces of motion information may need to be added to the historical motion information candidate list. The multiple pieces of motion information may have priority, and the motion information with higher priority may be added to a position closer to the begin in the head. The motion information with lower priority may be added to a position of the head closer to the end.

The priority of the motion information of each coded or decoded image block may be determined according to the positional relationship between the coded or decoded image block and the current region.

For example, the priority of the motion information of the image block located on the left side of the current region may be higher than the priority of the motion information of the image blocks on the upper left and lower left.

Optionally, in one embodiment, the image blocks in the second region that can be used to update the historical motion information candidate list may be image blocks in an affine transformation motion compensation mode (affine) mode. Optionally, the affine mode may be an affine motion (irregular motion such as zoom in/out, rotation, etc.) field describing the entire image block according to the motion information of the control point.

Optionally, in one embodiment, one or more second regions can be selected to update the historical motion information candidate list. When one second region is selected to update the historical motion information candidate list, the one second region may be a region encoded or decoded before the first region.

Optionally, in one embodiment, the second region and the first region may be arranged along the row direction of the image, or arranged along the column direction of the image.

That is, when updating the historical motion information candidate list used in the current region, the adopted region may need to have the same row arrangement or the same column arrangement as the current region.

For example, as shown in FIG. 4, MER1 can be used to update the HMVP candidate list for encoding or decoding MER2, and MER3 can be used to update the HMVP candidate list for encoding or decoding MER4. MER2 cannot be used to update the HMVP candidate list for encoding or decoding MER3.

Or, as shown in FIG. 4, MER1 can be used to update the HMVP candidate list for encoding or decoding MER3, and MER2 can be used to update the HMVP candidate list for encoding or decoding MER4. MER3 cannot be used to update the HMVP candidate list for encoding or decoding MER2.

Optionally, in one embodiment, when the second region is the region which is encoded or decoded first in the row direction or column direction of the image, the HMVP candidate list used for encoding or decoding the second region at this time may be empty.

Specifically, each time the encoder finishes encoding a row (or a column) by row (or column), it can clear the historical motion information candidate list, such that when encoding the next row (or column), the historical motion information candidate list is empty.

The row (or column) mentioned here can include multiple regions. After multiple regions of one row (column) are encoded, multiple regions of the next row (column) can be encoded. A range of row (or column) coordinates of each row (or column) may be the same, and the range of column (or row) coordinates may be different.

The above-mentioned rows or columns may be CTU rows or columns, and each CTU row or CTU column may include at least one CTU, and each CTU may include at least one region.

At this time, when one CTU row or column is encoded, the HMVP list can be cleared, and then the next CTU row or column can be encoded.

For example, as shown in FIG. 4, when encoding the CU in MER1, if MER1 is the first MER in the current CTU row, the historical motion information candidate list used by all image blocks in MER1 is empty. If MER1 is not the first MER in the current CTU row, the historical motion information candidate list used by all image blocks in MER1 is the historical motion information candidate list after updating based on the motion information of the image blocks in the previous MER.

It should be understood that the scope of the present disclosure is not limited to the above description. For example, in another embodiment, only when the first region of the current frame is encoded or decoded, the historical motion information candidate list is empty, and the historical motion information candidate lists of other regions can be updated based on the motion information of the image blocks in the previous region.

For example, as shown in FIG. 4, when encoding the CU in MER1, if MER1 is the first MER in the current frame, the historical motion information candidate list used by all image blocks in MER1 is empty. If MER1 is not the first MER in the current frame, the historical motion information candidate list used by all image blocks in MER1 is the historical motion information candidate list updated based on the motion information of the image blocks in the previous MER.

Optionally, in one embodiment, when the historical motion information candidate list is updated, the historical motion information selected for the update may be compared with the candidate motion information that can be selected in other lists with higher priority (that is, the lists where candidate motion information is preferentially used to construct the motion information list as compared to the historical motion information candidate list) (pruning).

Specifically, if other lists with higher priority have been used to construct the motion information list, the historical motion information selected for update may be compared with the candidate motion information already in the motion information list.

If it is determined that the candidate motion information in the other lists with higher priority (or the candidate motion information already in the motion information list) is different from the selected historical motion information for updating, the historical motion information may be added to the historical motion information candidate list.

If it is determined that the candidate motion information in the other lists with higher priority (or the candidate motion information already in the motion information list) is the same as the selected historical motion information for updating, the historical motion information may not be added to the historical motion information candidate list.

For example, the motion information of the image blocks with lower priority in the second region may be selected as the historical motion information and added to the historical motion information candidate list, or the historical motion information candidate list may not be updated, or a small number of pieces of candidate historical motion information may be updated.

To reduce the number of the above comparisons and reduce the software and hardware resource overhead, the number of comparisons can be limited.

The maximum number of comparisons can be determined according to parameters including the number of pieces of candidate motion information (or candidate motion information already in the motion information list) in other lists with higher priority, or the number of pieces of candidate historical motion information included in the historical motion information candidate list.

For example, the specific limitation of the maximum value L can be L=(N<=4)?M:(8−N).

L represents the number of comparisons, and N represents the number of pieces of candidate motion information in other lists with higher priority (or the number of pieces of candidate motion information in the motion information list), and M represents the number of pieces of candidate historical motion information in the historical motion information candidate list.

The meaning of the above formula can be understood as: if N is less than or equal to 4, the maximum number of comparisons is equal to M, otherwise, the maximum number of comparisons is 8−N.

Optionally, in one embodiment, the foregoing historical motion information candidate list may be stored in a storage space. Optionally, in this case, using the motion information of at least one second image block included in the second region of the current frame to update the historical motion information candidate list may be performed after encoding or decoding in the second region is completed.

Specifically, storing the aforementioned historical motion information candidate list in a storage space can be understood as that the number of historical motion information candidate lists is one. In this case, after using the historical motion information candidate list to encode or decode the previous region, the historical motion information candidate list may be updated by using the motion information of the corresponding image blocks. Then the updated historical motion information candidate list may be used to encode or decode the image blocks in the current region. After encoding or decoding the image blocks in the current region, the historical motion information candidate list may be updated again, and the updated historical motion information candidate list may be used for encoding or decoding of the next region.

Optionally, in another embodiment, the aforementioned historical motion information candidate list may also be stored in a first storage space and a second storage space other than the first storage space, respectively. At this time, the candidate list of historical motion information stored in one of the storage spaces can be used to encode or decode the image blocks in the second region. When encoding or decoding the second region, the encoded or decoded second image blocks in the second region may be used to update the historical motion information candidate list stored in another storage space, such that the encoding or decoding process can be synchronized with the historical motion information candidate list.

For ease of understanding, two implementation manners will be provided below to describe the use manner of the historical motion information candidate list in the case where the above-mentioned historical motion information candidate list is stored in the first storage space and the second storage space, respectively.

In some embodiments, the historical motion information candidate list is respectively stored in a first storage space and a second storage space, and the second region is encoded or decoded by using the historical motion information candidate list in the second storage space. During the encoding process or decoding process of the second region, the motion information of at least one second image block included in the second region is used to update the historical motion information candidate list in the first storage space. And then, according to the updated historical motion information candidate list in the first storage space, each of the first image blocks is encoded or decoded respectively.

Further, after the encoding or decoding of the second region is completed, the updated historical motion information candidate list in the first storage space is used to update the historical motion information candidate list in the second storage space is updated. And then the updated historical motion information candidate list in the second storage space is used to encode or decode at least one third image block in the third region. Specifically, the historical motion information candidate list in the second storage space is updated, such that the updated historical motion information candidate list in the second storage space and the updated historical motion information candidate list in the first storage space are the same.

Specifically, when encoding or decoding the first region, that is, the region 1 (the first region of the current frame or the current CTU row), a storage space A and a storage space B respectively store the same historical motion information candidate list (the list can be empty). The region 1 can be encoded or decoded using the historical motion information candidate list in the storage space A. Since the encoding or decoding of the image blocks in the region 1 is completed in sequence, the motion information of the encoded or decoded image blocks can be used to update the historical motion information candidate list in the storage space B. After the encoding or decoding process of the region 1 is completed, the historical motion information candidate list in the storage space B may have been updated. Correspondingly, the updated historical motion information candidate list in the storage space B can be used to encode or decode the second region, that is, the region 2. And at the same time the updated historical motion information candidate list in the storage space B can be used to update the historical motion information candidate list in the storage space A. After the historical motion information candidate list in the storage space A is updated based on the updated historical motion information candidate list in the storage space B, during the encoding or decoding process of the region 2, the encoded or decoded image blocks in the region 2 can be used to updates the historical motion information candidate list in the storage space A again. After the encoding or decoding process of the region 2 is completed, the historical motion information candidate list in the storage space A may have been updated again, then the re-updated historical motion information candidate list in the storage space A can be used to encode or decode the image blocks in the third region, that is, the region 3, the image block in region 3, and also the re-updated historical motion information candidate list in the storage space A can be used to update the historical motion information candidate list in the storage space B again. Subsequent operations can refer to the previous description and so on.

In this implementation, the historical motion information candidate list may be stored in two storage spaces respectively. The historical motion information candidate list in each storage space may be alternately used for encoding or decoding regions, and during the encoding or decoding process of the regions, the historical motion information candidate list in each storage space can be used to update the historical motion information candidate list that is not used currently (including updating the historical motion information candidate list that is currently used to the currently unused historical motion information candidate list, as well as updating the motion information of the currently encoded or decoded image blocks to the currently unused historical motion information candidate list). The update of the historical motion information candidate list and the encoding or decoding of the image blocks can be synchronized, such that the encoding or decoding efficiency can be improved.

In some embodiments, the historical motion information candidate list is respectively stored in a first storage space and a second storage space, and the second region is encoded or decoded by using the historical motion information candidate list in the second storage space. During the encoding process or decoding process of the second region, the motion information of at least one second image block included in the second region is used to update the historical motion information candidate list in the first storage space. After the encoding process or decoding process of the second region is completed, the updated historical motion information candidate list in the first storage space is used to update the historical motion information candidate list in the second storage space. And then, each of the first image blocks is encoded or decoded respectively according to the updated historical motion information candidate list in the second storage space.

Further, during the encoding process or decoding process of the first region, the motion information of at least one first image block in the first region is used to update the updated historical motion information candidate list in the first storage space again. After the encoding process or decoding process of the first region is completed, the re-updated historical motion information candidate list in the first storage space is used to update the historical motion information candidate list in the second storage space again. And then at least one third image block in the third region is encoded or decoded by using the re-updated historical motion information candidate list in the second storage space. The historical motion information candidate list in the second storage space is updated such that the updated historical motion information candidate list in the second storage space is the same as the updated historical motion information candidate list in the first storage space.

Specifically, when encoding or decoding the first region, that is, the region 1 (the first region of the current frame or the current CTU row), a storage space A and a storage space B respectively store the same historical motion information candidate list (the list can be empty). The region 1 can be encoded or decoded using the historical motion information candidate list in the storage space A. Since the encoding or decoding of the image blocks in the region 1 is completed in sequence, the motion information of the encoded or decoded image blocks can be used to update the historical motion information candidate list in the storage space B. After the encoding or decoding process of the region 1 is completed, the historical motion information candidate list in the storage space B may have been updated. Correspondingly, the updated historical motion information candidate list in the storage space B can be used to update the historical motion information candidate list in the storage space A, to obtain the updated historical motion information candidate list in the storage space A. And the updated historical motion information candidate list in the storage space A can be used to encode or decode the second region, that is, the region 2. During encoding or decoding the region 2, the historical motion information candidate list in the storage space B can be updated again. After the encoding or decoding process of the region 2 is completed, the historical motion information candidate list in the storage space B may have been updated again. The historical motion information candidate list in the storage space B can be used to update the historical motion information candidate list in the storage space A again, and the re-updated historical motion information candidate list in the storage space A can be used to encode or decode the region 3. Subsequent operations can refer to the previous description and so on.

In this implementation, the historical motion information candidate list may be stored in two storage spaces respectively. The historical motion information candidate list in a first storage space of the two storage spaces may be used for encoding or decoding of the regions, and during the encoding or decoding process of the regions, the historical motion information candidate list in a second storage space of the two storage spaces can be updated. After the encoding or decoding process of the regions, the updated historical motion information candidate list in the second storage space may be used to update the historical motion information candidate list in the first storage space. Since the time to use an updated historical motion information candidate list n to update another historical motion information candidate list is likely to be less than the time to update the historical motion information candidate list with the motion information of the image blocks, in this implementation manner, after the encoding or decoding of the regions is completed, it may be only necessary to use only one updated historical motion information candidate list to update another historical motion information candidate list. The update may require a shorter time here, which can improve the encoding or decoding efficiency.

The above describes how to update the historical motion information candidate list, and the following will describe how to use the updated historical motion information candidate list for encoding or decoding.

Specifically, the updated historical motion information candidate list may be used to generate a motion information list for each first image block in the first region; and the motion information list generated for each first image block may be used to select motion information for each first image block.

For the encoder side, when selecting motion information from the motion information list, the first image block to be encoded can be matched with the image block corresponding to each motion information in the motion information list, and the motion information corresponding to one image block with the least matching cost may be used as the selected motion information, and the index of the selected motion information may be written into the bitstream.

The decoder side can construct the motion information list in the same way, and read the index of the motion information from the bitstream. Then the decoder side may directly select the motion information of the current image block from the motion information list according to the index, to further decode according to the motion information.

The embodiment with the Merge mode and the motion information list which is an MVP candidate list will be used as an example to illustrate how to establish the motion information list.

The MVP candidate list may include at least a portion of (1) to (5) described below.

Specifically, the space domain candidate MVs in (1) can be used to construct the MVP candidate list. If the number of candidate MVPs included in the formed MVP candidate list at this time does not reach the preset number, the time domain candidates MVs in (2) may be added further to the MVP candidate list including the space domain candidate MVs. If the number of candidate MVPs candidates included in the MVP candidate list formed at this time does not reach the preset number, the paired average candidate MVs in (3) can be further added to the MVP candidate list including the space domain candidate MVs and the time domain candidate MVs at this time. If the number of candidate MVPs included in the formed MVP candidate list does not reach the preset number, the HMVPs in (4) can be further added to the MVP candidate list including the space domain candidate MVs, the time domain candidate MVs, and the paired average candidate MVs. If the number of candidate MVPs included in the formed MVP candidate list does not reach the preset number, the zero vectors in (5) can be further added to the MVP candidate list including the space domain candidate MVs, the time domain candidate MVs, the paired average candidate MVs, and the HMVPs, until the number of candidate MVPs in the MVP candidate list reaches the preset value.

When adding some candidates of one of items (1) to (5) to the MVP candidate list, if the number of candidate MVP candidates included in the list has reached the preset number, the remaining elements of the item may be stopped to be added to the MVP candidate list.

The items that constitute the MVP candidate list are listed below.

(1) Space Domain Candidate MV

The MVs of the adjacent image blocks in the spatial domain of the current image block can be used as the candidate MVPs that can be added to the MVP candidate list.

Figure 7:
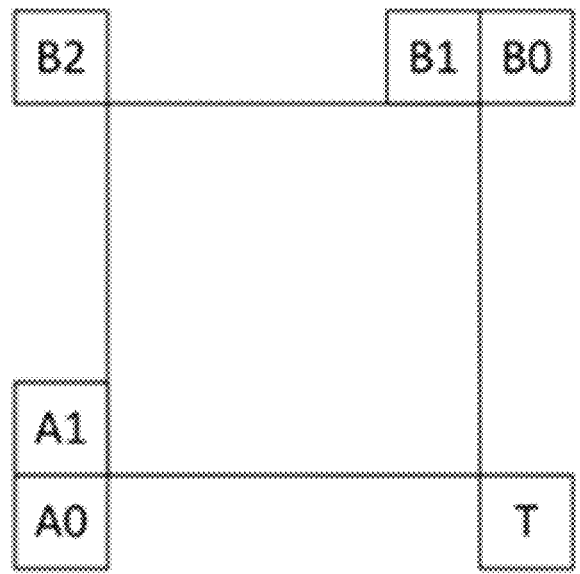
FIG. 7 is a schematic diagram showing adjacent blocks of an image block consistent with an embodiment of the present disclosure.

For example, as shown in FIG. 7, assuming that the image block in the lower left corner of the current image block is A0, the image block on the left is A1, the image block in the upper left corner is B2, the upper image block is B1, and the upper right corner is B0, the order to be sued as the candidate MVPs is A1->B1->B0->A0->B2 from high to low in priority.

(2) Time Domain Candidate MV

The MVs of the image blocks adjacent to the current image block in the time domain can be used as candidate MVPs that can be added to the MVP candidate list.

Different from the spatial domain candidate MV, the temporal candidate MV may not directly use the motion information of the candidate block, and may be adjusted according to the temporal position relationship between the current frame and the reference frame.

(3) Paired Average Candidate MV

The paired average candidate MVs are derived by averaging the candidate MVPs currently constituting the MVP candidate list according to a predefined pairing manner.

The predefined pairing manner and sequence can be: (0, 1), (0, 2), (1, 2), (0, 3), (1, 3), (2, 3), where 0, 1, 2, and 3 respectively represent the 1st, 2nd, 3rd, and 4th candidate MVP candidates in the MVP candidate list, and each bracket represents the MVP candidates within it for averaging.

(4) HMVP

The MVs of the encoded image blocks can be used to construct the HMVP candidate list, and the candidate HMVPs in the HMVP candidate list can be selected as the candidate MVP that can be selected to be added to the MVP candidate list.

(5) Zero Vector

When the number of the MVP candidates in the MVP candidate list does not reach the preset value after adding items in (1) to (4), the zero vectors may be used to fill until the number of the MVP candidates in the MVP candidate list reaches the preset value.

It should be understood that the motion information list introduced above is only a specific implementation manner of the embodiments of the present disclosure, and does not limit the scope of the present disclosure.

Optionally, in one embodiment, when constructing the spatial domain motion information candidate list, it is also possible to avoid using the motion information of the image blocks in the same region for construction. Specifically, the image blocks corresponding to the motion information in the spatial domain motion information candidate list corresponding to each first image block does not belong to the first region.

Figure 8:
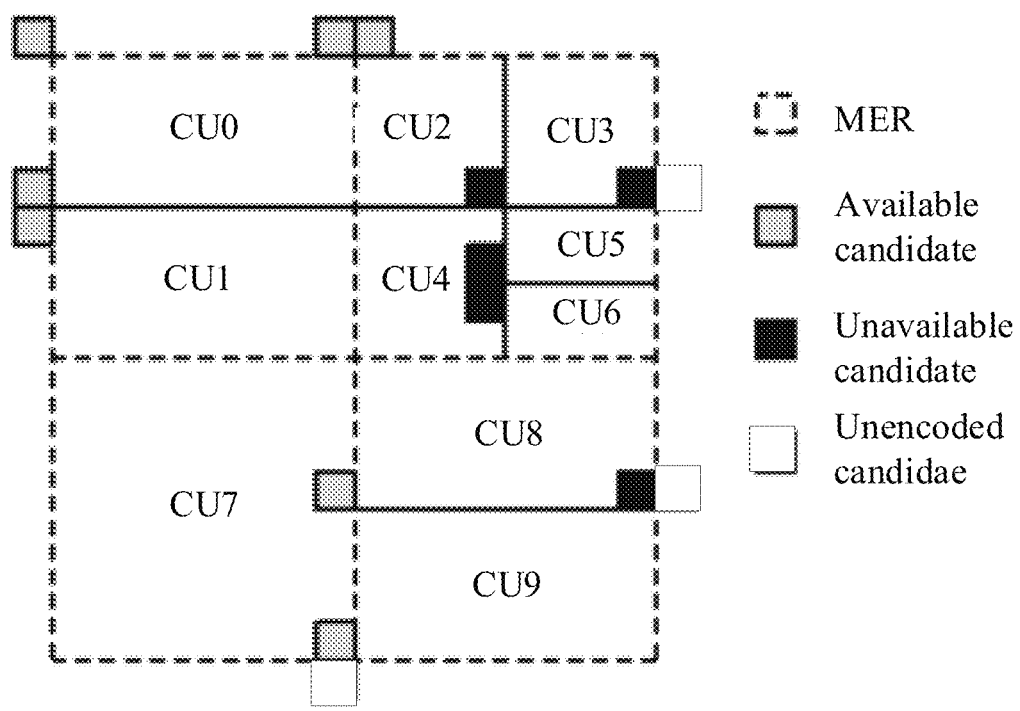
FIG. 8 is a schematic diagram showing spatial domain candidates consistent with an embodiment of the present disclosure.

For example, as shown in FIG. 8, for the first MER, all possible pieces of spatial domain candidate motion information corresponding to the image block CU0 (the motion information of the image block where the gray filling block is located) are available, because the image blocks corresponding to these pieces of spatial domain candidate motion information are outside the MER where CU0 is located. For the second MER CU5, the spatial domain candidate motion information should originally include the motion information of the image blocks corresponding to the three surrounding black filling blocks and one white filling block. Because the image blocks corresponding to the white filling block are still uncoded, and the image blocks corresponding to the three black filling blocks belong to the same MER as CU5, the spatial domain candidate motion information of CU5 may not include the motion information of these blocks and may be empty, or the motion information of other MER image blocks can be selected as candidates for the spatial domain candidate motion information list. For CU9, the spatial domain candidate motion information should originally include the motion information of the image blocks corresponding to the two surrounding gray filling blocks, the one black filling block, and the two white filling blocks. Because the image block corresponding to the white filling block is not encoded yet, the image block corresponding to the one black filling block belongs to the same MER as CU9, the spatial domain candidate motion information list of CU9 may include the motion information of the image blocks corresponding to the two gray filling blocks.

In the present disclosure, the motion information of the encoded or decoded second image blocks can be used to construct the historical motion information candidate list, and the constructed historical motion information candidate list can be used to encode or decode the plurality of first image blocks in the first region. The dependence of the plurality of first image blocks may be overcame, to allow the plurality of first image blocks in the first region to be independently encoded or decoded.

Solution Two

In some examples, an area (for example, the first region or the second region) in the embodiments of the present disclosure may refer to an image block corresponding to a specific parent node. The specific parent node is explained below.

In some examples, after an image is divided into multiple image blocks (for example, after being divided into multiple image blocks according to a fixed size), each image block can be further divided into different image blocks according to a quadtree method, a ternary tree method, or a binary tree method. The depths of different image blocks can be the same or different. In some video coding and decoding standards, an image block corresponding to a leaf node on a partition tree is also referred to as a prediction unit (PU), or a coding unit (CU)/decoding unit (DU).

The specific parent node means that, in the partition tree of image blocks, the image blocks located at all the leaf nodes of the specific parent node use the same motion information candidate list when acquiring their respective motion information. For example, same merge candidate list (Share Merge List) is used. All leaf nodes under a specific parent node are encoded/decoded in parallel. In some examples, the size of the image block at a specific parent node is greater than, or greater than or equal to, X pixels (X is a positive integer, for example, 32), and the size of the image block corresponding to at least one of the leaf nodes after the specific parent node is divided is less than or equal to, or less than, Y pixels (Y is a positive integer less than or equal to X, for example, 32). When the shared candidate list is being constructed, the image block at the specific parent node is used as the current block to construct the candidate list.

When the motion information candidate list is being constructed, a candidate HMVP is selected from the HMVP candidate list as a candidate in the motion information candidate list. All leaf nodes under a specific parent node use the same HMVP candidate list in the process of making prediction.

In one example, the HMVP candidate list was set before the encoding/decoding of the first leaf node under the specific parent node. The setting method includes backing up the HMVP candidate list for which encoding/decoding has proceeded to the current node, to obtain a backup HMVP candidate List. That is, when the leaf nodes under the specific parent node are being encoded, there are an original HMVP candidate list and a backup HMVP candidate list, i.e., a total of two HMVP candidate lists. When the leaf nodes under the specific parent node are being encoded/decoded, one of the HMVP candidate lists is used to determine the candidates in the motion information candidate list, but the used HMVP candidate list is not updated; while the other HMVP candidate list is not used, but after each leaf node under the specific parent node is subject to encoding/decoding, the unused HMVP candidate list is updated according to the motion information of the leaf node.

In one example, when the leaf nodes of the specific parent node are being encoded/decoded, there is no need to back up the HMVP candidate list. In the process of predicting all leaf nodes under the specific parent node, the HMVP candidate list shared by all leaf nodes remains unchanged. After all leaf nodes of the specific parent node are encoded/decoded, the HMVP candidate list is updated. This can save the memory cost caused by the use of two HMVP candidate lists, reduce design complexity, and ensure the purpose of parallel encoding/decoding of all leaf nodes under the specific parent node. Experimental results show that this approach has negligible impact on performance, and at the same time saves a certain amount of time complexity.

In some embodiments, the HMVP candidate list may be updated according to the motion information of the last leaf node that was encoded/decoded or the motion information of the last N (N is a positive integer greater than 1) leaf nodes that were encoded/decoded.

In some embodiments, the HMVP candidate list is updated according to the motion information of the leaf node whose lower right pixel position coincides with the lower right pixel position of the specific parent node, among the leaf nodes under the specific parent node. In some examples, the leaf node whose lower right pixel position coincides with the lower right pixel position of the specific parent node is also the last leaf node under the specific parent node that was encoded/decoded.

In some embodiments, the pixel coordinates of the upper left corner, the length, and the width of the image block at the specific parent node are (x0, y0), L0, and W0, respectively. When the HMVP candidate list is being updated, a target leaf node is determined from all the leaf nodes under the specific parent node, and the HMVP candidate list is updated according to the motion information of the target leaf node. The target leaf node refers to that the pixel position of the upper left corner is (x1, y1), the length is L1, the width is W1, and x1+L1=x0+L0, y1+W1=y0+W0.

The above two different interpretations of "area" in the video processing method correspond to scheme one and scheme two, respectively. In some examples, the methods described in scheme one and scheme two above can be combined. For example, a specific parent node may be a certain image block in an MER.

Scheme one and scheme two both specify some examples of the timing for updating the HMVP candidate list. In the case that the specific parent node can be an image block in an MER (for example, an image block in the first region or the second region), the HMVP candidate list may only be updated when the conditions for the update timing specified in both scheme one and scheme two are met; alternatively, the HMVP candidate list can be updated as long as the condition for the update timing in one of the two schemes is met.

As another example, both scheme one and scheme two specify some examples of motion information of an image block used to update the HMVP candidate list. The specific parent node may be a certain image block in an MER (for example, a certain image block in the first region or the second region). In the case of a certain image block in the second region), only the motion information of an image block satisfying the conditions in both scheme one and scheme two is used to update the HMVP candidate list; alternatively, the motion information of an image block can be used to update the HMVP candidate list as long as the image block satisfies the condition specified in one of the two schemes.

Figure 9:
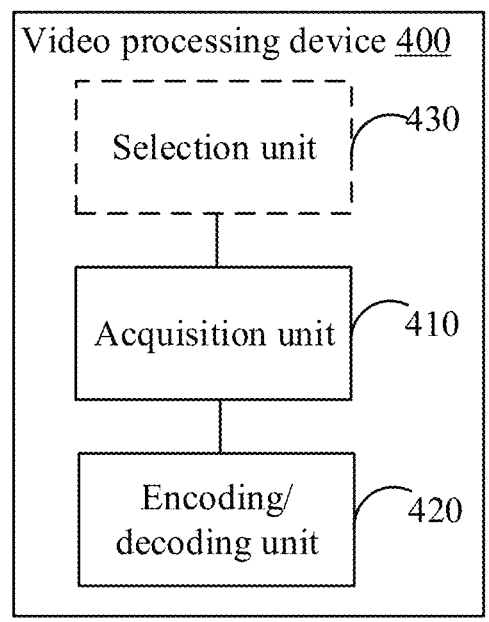
FIG. 9 is a schematic block diagram of a video processing device consistent with an embodiment of the present disclosure.

The present disclosure also provides a video processing device 400. As shown in FIG. 9, in one embodiment, the video processing device 400 includes an acquisition unit 410 and an encoding/decoding unit 420.

The acquisition unit 410 is configured to acquire a historical motion information candidate list. The historical motion information candidate list is used to encode or decode each first image block of a plurality of first image blocks included in a first region in a current frame. The historical motion information candidate list is obtained based on motion information of second image blocks, and the second image blocks are encoded or decoded image blocks other than the image blocks included in the first region.

The encoding/decoding unit 420 is configured to separately encode or decode each of the plurality of first image blocks according to the historical motion information candidate list.

Optionally, in one embodiment, the acquisition unit 410 may be further configured to: encode or decode the plurality of first image blocks in parallel.

Optionally, in one embodiment, when encoding or decoding different first image blocks of the plurality of first image blocks, the used historical motion information candidate list may include candidate historical motion information with an order same as an order of the candidate historical motion information in the historical motion information candidate list.

Optionally, in one embodiment, the acquisition unit 410 may be further configured to: use the motion information of at least one second image block included in the second region of the current frame to update the historical motion information candidate list. The updated historical motion information candidate list may be used to encode or decode the plurality of first image blocks.

Optionally, in one embodiment, the encoding or decoding process of the second region may be earlier than that of the first region, and the image blocks of the second region may be encoded or decoded using the historical motion information candidate list that has not been updated.

Optionally, in one embodiment, when the historical motion information candidate list is updated, the number of pieces of candidate historical motion information added to the historical motion information candidate list may be less than a preset value, and/or the number of pieces of candidate historical motion information deleted from the historical motion information candidate list may be less than the preset value.

Optionally, in one embodiment, the device 400 may further including a selection unit 430.

The selection unit 430 may be configured to select at least one second image block from the image blocks included in the second region according to position coordinates of the image blocks included in the second region.

Optionally, in one embodiment, when selecting the at least one second image block from the image blocks included in the second region, the priority of the image blocks on the right in the second region may be higher than the priority of the image blocks on the left in the second region, and/or the priority of the image blocks at the lower side of the second region may be higher than the priority of the image blocks at the upper side of the second region.

Optionally, in one embodiment, the at least one second image block may include an image block in the second region being encoded or decoded last, and/or include image blocks at specified positions in the second region.

Optionally, in one embodiment, the image blocks at the specified position in the second region may include image blocks located at at least one of the positions including the upper left corner of the second region, the upper right corner of the second region, the lower left corner of the second region, the lower right corner of the second region, and the center point of the second region.

Optionally, in one embodiment, the acquisition unit 410 may be further configured to: perform weighting process on the motion information of a plurality of second image blocks; and update the historical motion information candidate list by using the motion information after the weighting process.

Optionally, in one embodiment, the second region and the first region may be arranged along the row direction of the image, or arranged along the column direction of the image.

Optionally, in one embodiment, the first region and the second region may belong to same coding tree unit (CTU) rows or columns, and each CTU row or CTU column may include at least one CTU, and each CTU may include at least one region.

Optionally, in one embodiment, when the second region is the region which is encoded or decoded first in the row direction or column direction of the image, the historical motion information candidate list used for encoding or decoding the second region may be empty.

Optionally, in one embodiment, the second region may be a region that is encoded or decoded before the first region.

Optionally, in one embodiment, the acquisition unit 410 may be further configured to: add the first candidate historical motion information to be added to the header of the historical motion information candidate list.

Optionally, in one embodiment, the acquisition unit 410 may be further configured to: delete the candidate historical motion information at the end of the historical motion information candidate list or the candidate historical motion information that is the same as the first candidate historical motion information.

Optionally, in one embodiment, the second image blocks may be image blocks with affine transformation motion compensation mode.

Optionally, in one embodiment, the encoding/decoding unit 420 may be further configured to: using the historical motion information candidate list to generate a motion information list for each first image block of the plurality of first image blocks, and select the motion information for each first image block of the plurality of first image blocks by using the generated motion information list for each first image block of the plurality of first image blocks.

Optionally, in one embodiment, the encoding/decoding unit 420 may be further configured to: use the historical motion information candidate list and the spatial domain motion information candidate list corresponding to each first image block of the plurality of first image blocks, to generate a motion information list for each first image block of the plurality of first image blocks. The image blocks corresponding to the motion information in the spatial domain motion information candidate list corresponding to each first image block of the plurality of first image blocks may not belong to the first region.

Optionally, in one embodiment, the historical motion information candidate list is an HMVP candidate list predicted based on historical motion vectors.

Optionally, in one embodiment, the historical motion information candidate list may be stored in a storage space.

Optionally, in one embodiment, updating of the historical motion information candidate list using the motion information of the at least one second image block included in the second region of the current frame may be performed after the second region is encoded or decoded.

Optionally, in one embodiment, the historical motion information candidate list may be stored in a first storage space and a second storage space respectively. The second region may be encoded or decoded by using the historical motion information candidate list in the second storage space.

The acquisition unit may be further configured to: when encoding or decoding the second region, use the motion information of the at least one second image block in the second region to update the historical motion information candidate list stored in the first storage space.

The encoding/decoding unit 420 may be further configured to: encode or decode each first image block of the plurality of first image blocks in the first region according to the updated historical motion information candidate list stored in the first storage space.

Optionally, in one embodiment, the acquisition unit 410 may be further configured to: after the encoding process or decoding process of the second region is completed, use the updated historical motion information candidate list in the first storage space to update the historical motion information candidate list in the second storage space.

Optionally, in one embodiment, the acquisition unit 410 may be further configured to: make the updated historical motion information candidate list in the second storage space same as the historical motion information candidate list in the first storage space by update the historical motion information candidate list in the second storage space.

Optionally, in one embodiment, the historical motion information candidate list may be stored in a first storage space and a second storage space respectively. The second region may be encoded or decoded by using the historical motion information candidate list in the second storage space.

The acquisition unit may be further configured to:
during the encoding process or decoding process of the second region, use the motion information of the at least one second image block included in the second region to update the historical motion information candidate list in the first storage space; and
after the encoding process or decoding process of the second region is completed, use the updated historical motion information candidate list in the first storage space to update the historical motion information candidate list in the second storage space.

The encoding/decoding unit 420 may be further configured to: encode or decode each of the first image blocks respectively according to the updated historical motion information candidate list in the second storage space.

In one embodiment, the acquisition unit may be further configured to:
during the encoding process or decoding process of the first region, use the motion information of the at least one first image block included in the first region to update the historical motion information candidate list in the first storage space again; and
after the encoding process or decoding process of the first region is completed, use the re-updated historical motion information candidate list in the first storage space to update the historical motion information candidate list in the second storage space again.

Optionally, in one embodiment, the acquisition unit 410 may be further configured to: make the updated historical motion information candidate list in the second storage space same as the historical motion information candidate list in the first storage space by update the historical motion information candidate list in the second storage space.

Optionally, the plurality of first image blocks in the first region are image blocks obtained by subjecting the first region to quadtree partition, ternary tree partition, or binary tree partition.

Optionally, the plurality of first image blocks in the first region share the same motion information candidate list during prediction.

Optionally, the plurlaity of first image blocks in the first region all adopt the merge mode during prediction, and share the same merge mode motion information candidate list.

Optionally, the acquiring unit is further configured to obtain a candidate HMVP according to the historical motion information candidate list, where the candidate HMVP is a candidate in the motion information candidate list.

Optionally, the historical motion information candidate list remains unchanged while prediction is being performed for the plurality of first image blocks in the first region.

Optionally, the encoding/decoding unit 420 is further configured to update the historical motion information candidate list after completing the encoding/decoding of the plurality of first image blocks in the first region.

Optionally, the encoding/decoding unit 420 is further configured to update the historical motion information candidate list according to the motion information of the last first image block in the first region that was encoded/decoded.

Optionally, the lower right corner of the last first image block in the first region that was encoded/decoded coincides with the lower right corner of the first region.

Optionally, the pixel coordinates of the upper left corner of the first region are (x0, y0), the length and width of the first region are L0 and W0, respectively. The encoding/decoding unit 420 is further configured to determine a target first image block in the first region, and update the historical motion information candidate list according to the motion information of the target first image block. The pixel position of the upper left corner, the length, and the width of the target first image block are (x1, y1), L1, and W1, respectively, and x1+L1=x0+L0, y1+W1=y0+W0.

The video processing device 400 may be used to implement operations performed by the encoder side or the decoder side in the video processing method provided by various embodiments of the present disclosure.

Figure 10:
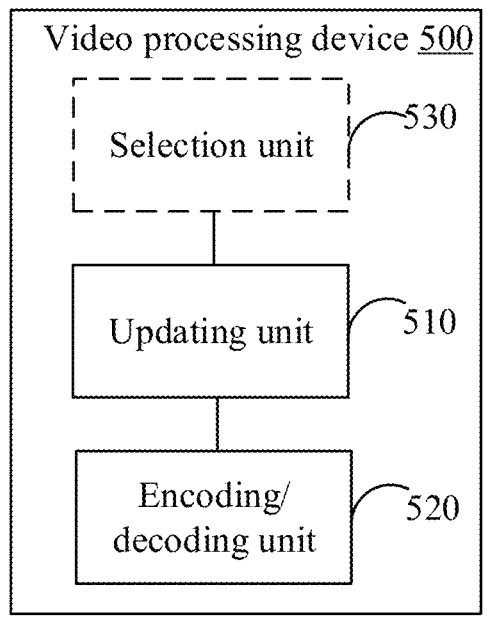
FIG. 10 is a schematic block diagram of a video processing device consistent with an embodiment of the present disclosure.

The present disclosure also provides another video processing device 500 shown in FIG. 10. The video processing device 500 includes an encoding/decoding unit 510 and an updating unit 520.

The encoding/decoding unit 510 is configured to: use the historical motion information candidate list to encode or decode at least one second image block in the second region of the current frame.

The updating unit 520 is configured to: update the historical motion information candidate list according to the motion information of at least a portion of the second image blocks in the second region after being encoded or decoded, to obtain the updated historical motion information candidate list.

The encoding/decoding unit 510 is further configured to: use the updated historical motion information candidate list to encode or decode the plurality of first image blocks in the first region of the current frame.

Optionally, in one embodiment, the encoding/decoding unit 510 may be further configured to: use the updated historical motion information candidate list to encode or decode the plurality of first image blocks in the first region of the current frame in parallel.

Optionally, in one embodiment, when encoding or decoding different first image blocks of the plurality of first image blocks, the used historical motion information candidate list may include candidate historical motion information with an order same as an order of the candidate historical motion information in the historical motion information candidate list.

Optionally, in one embodiment, when the historical motion information candidate list is updated, the number of pieces of candidate historical motion information added to the historical motion information candidate list may be less than a preset value, and/or the number of pieces of candidate historical motion information deleted from the historical motion information candidate list may be less than the preset value.

Optionally, in one embodiment, the device 500 may further include a selection unit 530 configured to: select at least a portion of the second image blocks from the image blocks included in the second region based on the position coordinates of the image blocks of the second region.

Optionally, in one embodiment, when selecting the at least portion of the second image blocks from the image blocks included in the second region, the priority of the image blocks on the right in the second region may be higher than the priority of the image blocks on the left in the second region, and/or the priority of the image blocks at the lower side of the second region may be higher than the priority of the image blocks at the upper side of the second region.

Optionally, in one embodiment, the updating unit 520 may be further configured to: perform weighting process on the motion information of the at least portion of the second image blocks; and update the historical motion information candidate list by using the motion information after the weighting process.

Optionally, in one embodiment, the second region and the first region may be arranged along the row direction of the image, or arranged along the column direction of the image.

Optionally, in one embodiment, the first region and the second region may belong to same coding tree unit (CTU) rows or columns, and each CTU row or CTU column may include at least one CTU, and each CTU may include at least one region.

Optionally, in one embodiment, when the second region is the region which is encoded or decoded first in the row direction or column direction of the image, the historical motion information candidate list used for encoding or decoding the second region may be empty.

Optionally, in one embodiment, the second region may be a region that is encoded or decoded before the first region.

Optionally, in one embodiment, the updating unit 520 may be further configured to: add the first candidate historical motion information to be added to the header of the historical motion information candidate list.

Optionally, in one embodiment, the updating unit 520 may be further configured to: delete the candidate historical motion information at the end of the historical motion information candidate list or the candidate historical motion information that is the same as the first candidate historical motion information.

Optionally, in one embodiment, the second image blocks may be image blocks not in affine transformation motion compensation mode.

Optionally, in one embodiment, the encoding/decoding unit 510 may be further configured to: using the historical motion information candidate list to generate a motion information list for each first image block of the plurality of first image blocks, and select the motion information for each first image block of the plurality of first image blocks by using the generated motion information list for each first image block of the plurality of first image blocks.

Optionally, in one embodiment, the encoding/decoding unit 510 may be further configured to: use the historical motion information candidate list and the spatial domain motion information candidate list corresponding to each first image block of the plurality of first image blocks, to generate a motion information list for each first image block of the plurality of first image blocks. The image blocks corresponding to the motion information in the spatial domain motion information candidate list corresponding to each first image block of the plurality of first image blocks may not belong to the first region.

Optionally, in one embodiment, the historical motion information candidate list is an HMVP candidate list predicted based on historical motion vectors.

Optionally, in one embodiment, the at least one second image block may include an image block in the second region being encoded or decoded last, and/or include image blocks at specified positions in the second region.

Optionally, in one embodiment, the image blocks at the specified position in the second region may include image blocks located at at least one of the positions including the upper left corner of the second region, the upper right corner of the second region, the lower left corner of the second region, the lower right corner of the second region, and the center point of the second region.

Optionally, in one embodiment, the historical motion information candidate list may be stored in a storage space.

Optionally, in one embodiment, updating of the historical motion information candidate list using the motion information of the at least portion of the second image blocks included in the second region of the current frame may be performed after the second region is encoded or decoded.

Optionally, in one embodiment, the historical motion information candidate list may be stored in a first storage space and a second storage space respectively. The second region may be encoded or decoded by using the historical motion information candidate list in the second storage space.

The updating unit may be further configured to: when encoding or decoding the second region, use the motion information of the at least portion of the second image blocks in the second region to update the historical motion information candidate list stored in the first storage space.

The encoding/decoding unit 510 may be further configured to: encode or decode each first image block of the plurality of first image blocks in the first region according to the updated historical motion information candidate list stored in the first storage space.

Optionally, in one embodiment, the updating unit 520 may be further configured to: after the encoding process or decoding process of the second region is completed, use the updated historical motion information candidate list in the first storage space to update the historical motion information candidate list in the second storage space.

Optionally, in one embodiment, the updating unit 520 may be further configured to: make the updated historical motion information candidate list in the second storage space same as the historical motion information candidate list in the first storage space by update the historical motion information candidate list in the second storage space.

Optionally, in one embodiment, the historical motion information candidate list may be stored in a first storage space and a second storage space respectively. The second region may be encoded or decoded by using the historical motion information candidate list in the second storage space.

The updating unit 520 may be further configured to:
during the encoding process or decoding process of the second region, use the motion information of the at least portion of the second image blocks included in the second region to update the historical motion information candidate list in the first storage space; and
after the encoding process or decoding process of the second region is completed, use the updated historical motion information candidate list in the first storage space to update the historical motion information candidate list in the second storage space.

The encoding/decoding unit 510 may be further configured to: encode or decode each of the first image blocks respectively according to the updated historical motion information candidate list in the second storage space.

In one embodiment, the updating unit 520 may be further configured to:
during the encoding process or decoding process of the first region, use the motion information of the at least one first image block included in the first region to update the historical motion information candidate list in the first storage space again; and
after the encoding process or decoding process of the first region is completed, use the re-updated historical motion information candidate list in the first storage space to update the historical motion information candidate list in the second storage space again.

Optionally, in one embodiment, the updating unit 520 may be further configured to: make the updated historical motion information candidate list in the second storage space same as the historical motion information candidate list in the first storage space by update the historical motion information candidate list in the second storage space.

Optionally, the plurality of first image blocks in the first region are image blocks obtained by subjecting the first region to quadtree partition, ternary tree partition, or binary tree partition.

Optionally, the plurality of first image blocks in the first region share the same motion information candidate list during prediction.

Optionally, the plurality of first image blocks in the first region all adopt the merge mode during prediction, and share the same merge mode motion information candidate list.

Optionally, the acquiring unit is further configured to obtain a candidate HMVP according to the historical motion information candidate list, where the candidate HMVP is a candidate in the motion information candidate list.

Optionally, the historical motion information candidate list remains unchanged while prediction is being performed for the plurality of first image blocks in the first region.

Optionally, the updating unit 520 is further configured to update the historical motion information candidate list after completing the encoding/decoding of the plurality of first image blocks in the first region.

Optionally, the updating unit 520 is further configured to update the historical motion information candidate list according to the motion information of the last first image block in the first region that was encoded/decoded.

Optionally, the lower right corner of the last first image block in the first region that was encoded/decoded coincides with the lower right corner of the first region.

Optionally, the pixel coordinates of the upper left corner of the first region are (x0, y0), the length and width of the first region are L0 and W0, respectively. The updating unit 520 is further configured to determine a target first image block in the first region, and update the historical motion information candidate list according to the motion information of the target first image block. The pixel position of the upper left corner, the length, and the width of the target first image block are (x1, y1), L1, and W1, respectively, and x1+L1=x0+L0, y1+W1=y0+W0.

The video processing device 500 may be used to implement operations performed by the encoder side or the decoder side in the video processing method provided by various embodiments of the present disclosure.

Figure 11:
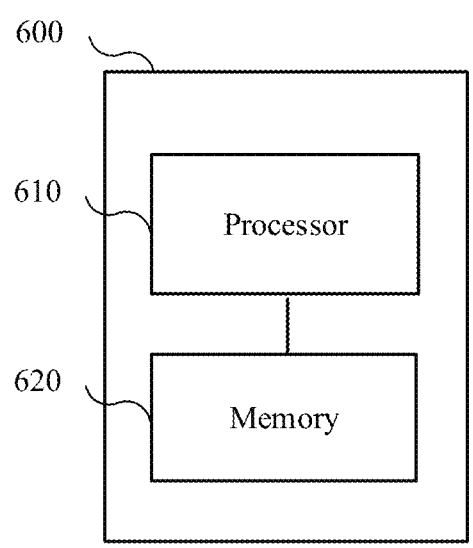
FIG. 11 is a schematic block diagram of a computer system consistent with an embodiment of the present disclosure.

The present disclosure also provides a computer system 600 shown in FIG. 11.

As shown in FIG. 11, the computer system 600 includes a processor 610 and a memory 620.

It should be understood that the computer system 600 may also include components commonly included in other computer systems, such as input and output devices, communication interfaces, etc., which are not limited in the embodiments of the present disclosure.

The memory 620 is configured to store computer-executable instructions.

The memory 620 may be various types of memory. For example, the memory 620 may include a high-speed random access memory (RAM), and may also include a non-volatile memory, such as at least one disk memory. The present disclosure has no limit on this.

The processor 610 is configured to access the memory 620 and execute the computer-executable instructions to perform operations in the video processing method provided by various embodiments of the present disclosure.

The processor 610 may include a microprocessor, a field programmable gate array (FPGA), a central processing unit (CPU), a graphics processing unit (GPU), etc. The present disclosure has no limit on this.

The video processing device and the computer system provided by various embodiments of the present disclosure may correspond to the execution body of the video processing method provided by various embodiments of the present disclosure. The operations and/or functions of various modules of the video processing device and the computer system are for implementing corresponding processes of the above-described video processing methods, and are not described here for simplicity.

The present disclosure also provides an electronic apparatus. The electronic apparatus may include the video processing device and the computer system provided by various embodiments of the present disclosure.

The present disclosure also provides a computer storage medium. The computer storage medium is configured to store computer program codes. The computer program codes are used to execute the video processing method provided by various embodiments of the present disclosure.

It should be understood that, in the present disclosure, the term "and/or" is merely an association relationship describing associated objects, which means that there may be three relationships. For example, A and/or B can mean: A alone exists, A and B exist at the same time, and B exists alone. In addition, the character "/" in this text generally indicates that the associated objects before and after are in an "or" relationship.

A person of ordinary skill in the art can be aware that the units and algorithm steps described in the embodiments disclosed herein can be implemented by electronic hardware, computer software, or a combination of both. To clearly illustrate the hardware and software interchangeability, in the above description, the composition and steps of each example have been generally described in accordance with the function. Whether these functions are executed by hardware or software depends on the specific application and design constraint conditions of the technical solution. Professionals and technicians can use different methods for each specific application to implement the described functions, but such implementation should not be considered beyond the scope of the present disclosure.

Those skilled in the art can clearly understand that, for the convenience and conciseness of description, the specific working process of the above-described system, device, and unit can refer to the corresponding process in the foregoing method embodiment, which will not be repeated here.

In the embodiments provided in the present disclosure, it should be understood that the disclosed system, device, and method may be implemented in other ways. For example, the device embodiments described above are only illustrative. For example, the division of the units is only a logical function division, and there may be other divisions in actual implementation. For example, multiple units or components may be combined or can be integrated into another system, or some features can be ignored or not implemented. In addition, the displayed or discussed mutual coupling or direct coupling or communication connection may be indirect coupling or communication connection through some interfaces, devices or units, and may also be electrical, mechanical or other forms of connection.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments of the present disclosure.

In addition, the functional units in the various embodiments of the present disclosure may be integrated into one processing unit, or each unit may exist alone physically, or two or more units may be integrated into one unit. The above-mentioned integrated unit can be implemented in the form of hardware or software functional unit.

When the integrated unit is implemented in the form of a software functional unit and sold or used as an independent product, it can be stored in a computer readable storage medium. Based on this understanding, the technical solution of the present disclosure is essentially or the part that contributes to the existing technology, or all or part of the technical solution can be embodied in the form of a software product. The computer software product is stored in a storage medium, and includes several instructions to enable a computer device (which may be a personal computer, a server, or a network device, etc.) to perform all or part of the steps of the method described in each embodiment of the present disclosure. The aforementioned storage medium includes: a U disk, a mobile hard disk, a read-only memory (ROM), a random access memory (RAM), a magnetic disk, an optical disk, or another medium that can store program codes.

The above are only specific implementations of embodiments of the present disclosure, but the scope of the present disclosure is not limited to this. Anyone familiar with the technical field can easily think of various equivalents within the technical scope disclosed in the present disclosure. These modifications or replacements shall be covered within the scope of the present disclosure. Therefore, the protection scope of the present disclosure shall be subject to the protection scope of the claims.

What is claimed is:

1. A bitstreams generating method comprising:
   obtaining a historical motion information candidate list, wherein the historical motion information candidate list is used for encoding each of a plurality of image blocks included in a region of a current frame; and
   encoding the plurality of image blocks according to the historical motion information candidate list, wherein:
      the historical motion information candidate list is a history-based motion vector prediction (HMVP) candidate list;
      during the process of encoding all the plurality of image blocks included in the region, the historical motion information candidate list is not updated;
      only the motion information of the last image block in the region is used to update the historical motion information candidate list after the encoding process of the last image block is finished; and
      the historical motion information candidate list is updated by:
         deleting candidate historical motion information at a second position in the historical motion information candidate list, the second position being a position in the historical motion information candidate list that is farthest to a first position in the historical motion information candidate list, and the first position is a position in the historical motion information candidate list that is first selected for constructing a motion information list; or
         deleting candidate historical motion information that is same as candidate historical motion information at a first position, and the first position is a position in the historical motion information candidate list that is first selected for constructing a motion information list; and generating bitstreams, the bitstreams including one or more indexes of motion information.

2. The method of claim 1, wherein the same historical motion information candidate list is used for encoding all the plurality of image blocks included in the region, wherein the used same historical motion information candidate list includes the same motion information and does not include the motion information of all the plurality of image blocks included in the region.

3. The method of claim 1, wherein:
a size of the region is equal to 16×16 pixels; and
the plurality of image blocks include 4×4 image blocks obtained by dividing the region according to a quadtree method.

4. The method of claim 1, wherein the historical motion information candidate list is updated by adding new candidate historical motion information to a position in the historical motion information candidate list that is first selected for using in a process of constructing a motion information list, the motion information list being constructed based on the historical motion information candidate list.

5. The method according to claim 1, wherein:
candidate historical motion information in the historical motion information candidate list adopted to perform the prediction for different ones of the plurality of image blocks has a same order as candidate historical motion information in the historical motion information candidate list.

6. The method of claim 1, wherein:
the region is a first region and the plurality of image blocks are a plurality of first image blocks; and
the historical motion information candidate list is obtained based on motion information of one or more second image blocks each being an encoded or decoded image block in a second region of the current frame outside the first region.

7. The method according to claim 6, wherein obtaining the historical motion information candidate list includes:
updating the historical motion information candidate list using the motion information of at least one of the one or more second image blocks, including:
updating the historical motion information candidate list according to the motion information of a last second image block, of the one or more second image blocks, in the second region that was encoded or decoded, a lower right corner of the last second image block in the second region that was encoded or decoded coinciding with a lower right corner of the second region.

8. The method according to claim 7, wherein updating the historical motion information candidate list further includes:
adding first candidate historical motion information to the first position.

9. The method according to claim 7, wherein when the historical motion information candidate list is updated:
a number of pieces of candidate historical motion information added to the historical motion information candidate list is smaller than a first preset value; and/or
a number of pieces of candidate historical motion information deleted from the historical motion information candidate list is smaller than a second preset value.

10. The method according to claim 6, wherein:
the first region and the second region belong to a same coding tree unit (CTU) row or a same CTU column;
the CTU row or the CTU column includes at least one CTU; and
each of the at least one CTU includes at least one region; and
the second region is a region that is encoded before the first region.

11. The method according to claim 6, wherein during the process of encoding all the plurality of image blocks included in the region:
the historical motion information candidate list does not include the motion information of all the plurality of image blocks included in the region; or
the same historical motion information candidate list is used.

12. A device comprising:
at least one memory storing instructions; and
at least one processor configured to execute the instructions to:
obtain a historical motion information candidate list, wherein the historical motion information candidate list is used for encoding each of a plurality of image blocks included in a region of a current frame; and
encode the plurality of image blocks according to the historical motion information candidate list, wherein:
the historical motion information candidate list is a history-based motion vector prediction (HMVP) candidate list;
during the process of encoding all the plurality of image blocks included in the region, the historical motion information candidate list is not updated;
only the motion information of the last image block in the region is used to update the historical motion information candidate list after the encoding process of the last image block is finished; and
the historical motion information candidate list is updated by:
deleting candidate historical motion information at a second position in the historical motion information candidate list, the second position being a position in the historical motion information candidate list that is farthest to a first position in the historical motion information candidate list, and the first position is a position in the historical motion information candidate list that is first selected for constructing a motion information list; or
deleting candidate historical motion information that is same as candidate historical motion information at a first position, and the first position is a position in the historical motion information candidate list that is first selected for constructing a motion information list.

13. The device of claim 12, wherein:
the region is a first region and the plurality of image blocks are a plurality of first image blocks;
the current frame includes a second region that is encoded before the first region and includes one or more second image blocks; and
obtain the historical motion information candidate list includes:
update the historical motion information candidate list according to the motion information of a last second image block of the one or more second image blocks, a lower right corner of the last second image block in the second region coinciding with a lower right corner of the second region.

14. The device of claim 12, wherein during the process of encoding all the plurality of image blocks included in the region:
   the historical motion information candidate list does not include the motion information of all the plurality of image blocks included in the region; or
   the same historical motion information candidate list is used.

15. A device comprising: at least one memory storing instructions; and at least one processor configured to execute the instructions to: obtain a historical motion information candidate list, wherein the historical motion information candidate list is used for encoding each of a plurality of image blocks included in a region of a current frame; and decode the plurality of image blocks according to the historical motion information candidate list, wherein: the historical motion information candidate list is a history-based motion vector prediction (HMVP) candidate list; during the process of decoding all the plurality of image blocks included in the region, the historical motion information candidate list is not updated only the motion information of the last image block in the region is used to update the historical motion information candidate list after the decoding process of the last image block is finished; and the historical motion information candidate list is updated by deleting candidate historical motion information at a second position in the historical motion information candidate list, the second position being a position in the historical motion information candidate list that is farthest to a first position in the historical motion information candidate list, and the first position is a position in the historical motion information candidate list that is first selected for constructing a motion information list; or deleting candidate historical motion information that is same as candidate historical motion information at a first position, and the first position is a position in the historical motion information candidate list that is first selected for constructing a motion information list.

16. The device of claim 15, wherein the same historical motion information candidate list is used for decoding all the plurality of first image blocks included in the first region, and the same historical motion information candidate list includes the same motion information.

17. The device of claim 15, wherein the historical motion information candidate list is obtained by:
   updating the historical motion information candidate list according to the motion information of a last second image block of the one or more second image blocks that have been encoded or decoded, a lower right corner of the last second image block in the second region coinciding with a lower right corner of the second region.

18. The device of claim 15, wherein the historical motion information candidate list is updated further by:
   adding first candidate historical motion information to the first position.

19. The device of claim 15, wherein during the process of decoding all the plurality of image blocks included in the region:
   the historical motion information candidate list does not include the motion information of all the plurality of image blocks included in the region; or
   the same historical motion information candidate list is used.

* * * * *